(12) United States Patent
Leuca et al.

(10) Patent No.: US 7,209,457 B1
(45) Date of Patent: Apr. 24, 2007

(54) METHODS AND SYSTEMS FOR MANAGING THE ROUTING OF PACKETS OVER A HYBRID COMMUNICATION NETWORK

(75) Inventors: Ileana A. Leuca, Bellevue, WA (US); Wen-Ping Ying, Bellevue, WA (US)

(73) Assignee: Cingular Wireless II, L.L.C., Atlanta, GA (US)

( * ) Notice: Subject to any disclaimer, the term of this patent is extended or adjusted under 35 U.S.C. 154(b) by 0 days.

(21) Appl. No.: 08/994,831

(22) Filed: Dec. 19, 1997

(51) Int. Cl.
H04Q 7/00 (2006.01)
H04B 7/216 (2006.01)
H04L 12/66 (2006.01)
H04L 12/28 (2006.01)

(52) U.S. Cl. ............. 370/328; 370/335; 370/342; 370/356; 370/389; 370/392; 370/395.21; 370/395.31; 455/557

(58) Field of Classification Search .......... 370/254, 370/351, 352–356, 389, 392, 400, 401, 465; 370/328, 335, 342; 455/445, 554–557, 466; 709/225
See application file for complete search history.

(56) References Cited

U.S. PATENT DOCUMENTS

| | | | |
|---|---|---|---|
| 4,549,291 A | 10/1985 | Renoulin et al. | |
| 4,577,066 A | 3/1986 | Bimonte et al. | |
| 5,535,199 A | 7/1996 | Amri et al. | |
| 5,610,910 A * | 3/1997 | Focsaneanu et al. | 370/351 |
| 5,625,877 A | 4/1997 | Dunn et al. | |
| 5,633,866 A | 5/1997 | Callon | |
| 5,712,907 A * | 1/1998 | Wegner et al. | 370/238 |
| 5,910,946 A * | 6/1999 | Csapo | 370/328 |
| 5,953,322 A * | 9/1999 | Kimball | 370/328 |
| 6,075,783 A * | 6/2000 | Voit | 370/352 |
| 6,078,581 A * | 6/2000 | Shtivelman et al. | 370/352 |
| 6,141,339 A * | 10/2000 | Kaplan et al. | 370/352 |
| 6,151,628 A * | 11/2000 | Xu et al. | 709/225 |
| 6,195,564 B1 * | 2/2001 | Rydbeck et al. | 455/557 |
| 6,295,457 B1 * | 9/2001 | Narayanaswamy | 455/466 |
| 6,584,094 B2 * | 6/2003 | Maroulis et al. | 370/352 |

FOREIGN PATENT DOCUMENTS

| | | |
|---|---|---|
| EP | 0 797 337 | 9/1997 |
| WO | WO 97/12493 | 4/1997 |
| WO | WO 97/13381 | 4/1997 |
| WO | WO 97/20445 | 6/1997 |

* cited by examiner

Primary Examiner—Chi Pham
Assistant Examiner—Melanie Jagannathan
(74) Attorney, Agent, or Firm—Paul, Hastings, Janofsky & Walker LLP (57) ABSTRACT

Methods and systems for routing information to a destination through a plurality of networks, wherein at least one of the networks is a packet network. The system comprises a routing processor for receiving a routing query signal, which specifies the destination to which the information will be routed and a memory for storing at least one characteristic of the destination. The processor determines a route for the transmission of the information based on the routing query and on the characteristics stored in the memory.

23 Claims, 5 Drawing Sheets

METHODS AND SYSTEMS FOR MANAGING THE ROUTING OF PACKETS OVER A HYBRID COMMUNICATION NETWORK

FIELD OF THE INVENTION

The present invention relates generally to the field of managing the routing of packets over a hybrid communication network, operating both in circuit switched and packet switched modes, and, more particularly, to the methods and systems for managing the routing of packets through the hybrid network based on the destination telephone number.

BACKGROUND OF THE INVENTION

Traditional telephone service providers have been planning the transition to packet switched networks. In planning this transition, consideration must be given to providing POTS users, who only have analog equipment, access to such networks. Such a transition should also facilitate communication between fixed wireless subscribers and POTs subscribers. Additionally, consideration must be given to providing local subscribers with direct access to their packet network.

Therefore, there remains a need to provide POTs and wireless service subscribers with improved direct access to packet networks, and particularly, a need for improving communication between such subscribers.

SUMMARY OF THE INVENTION

The present invention overcomes the above, and other, limitations by providing communication methods and systems for routing packets, such as digitized voice, from a fixed wireless service subscriber to a destination over a hybrid network, operating in both circuit switched and packet switched modes.

In one aspect, the invention features a system for managing the routing of information from a source to a destination through a plurality of networks, wherein at least one of the networks is a packet network. The system comprises a routing processor for receiving a routing query signal from the source. The signal specifying the destination to which the information will be routed. The system also comprises a memory for storing at least one characteristic of the source and at least one characteristic of the destination. The processor of the system determines a route for the transmission of the information based on the routing query signal and on the characteristics stored in the memory.

In another aspect, the invention features a method for managing the routing of information to a destination through a plurality of networks, wherein at least one of the networks is a packet network and each network is linked to at least one other network by a communication medium. The method comprises the steps of:

1) receiving a routing query signal specifying a destination to which the information will be routed;
2) storing at least one characteristic of the destination; and
3) determining a route for the transmission of the information based on the routing query and on the stored characteristics.

In another aspect, the invention features a method for managing the routing information from a subscriber of a fixed wireless service network to a destination through a plurality of networks, wherein at least one of said networks is a packet network and wherein each network is linked to at least one other network by a communication medium. The method comprises the steps of:

1) receiving a routing query signal from the subscriber of the fixed wireless service network;
2) storing information concerning at least one characteristic of the destination at a routing processor;
3) determining a transmission path for routing the information through the networks, the transmission path comprising elements of at least one of the networks in addition to elements of the packet network, wherein the step of determining the transmission path is based on the routing query signal and the stored characteristics;
4) sending a routing response signal from the routing processor to the subscriber; and
5) routing the information over the path.

DESCRIPTION OF THE PREFERRED EMBODIMENTS

The present invention relates to routing packets of, for example, digitized voice, from a subscriber of fixed wireless services to a subscriber at a destination through a hybrid network. The subscriber at the destination being either a subscriber of fixed wireless services or POTS services.

Figure 1:
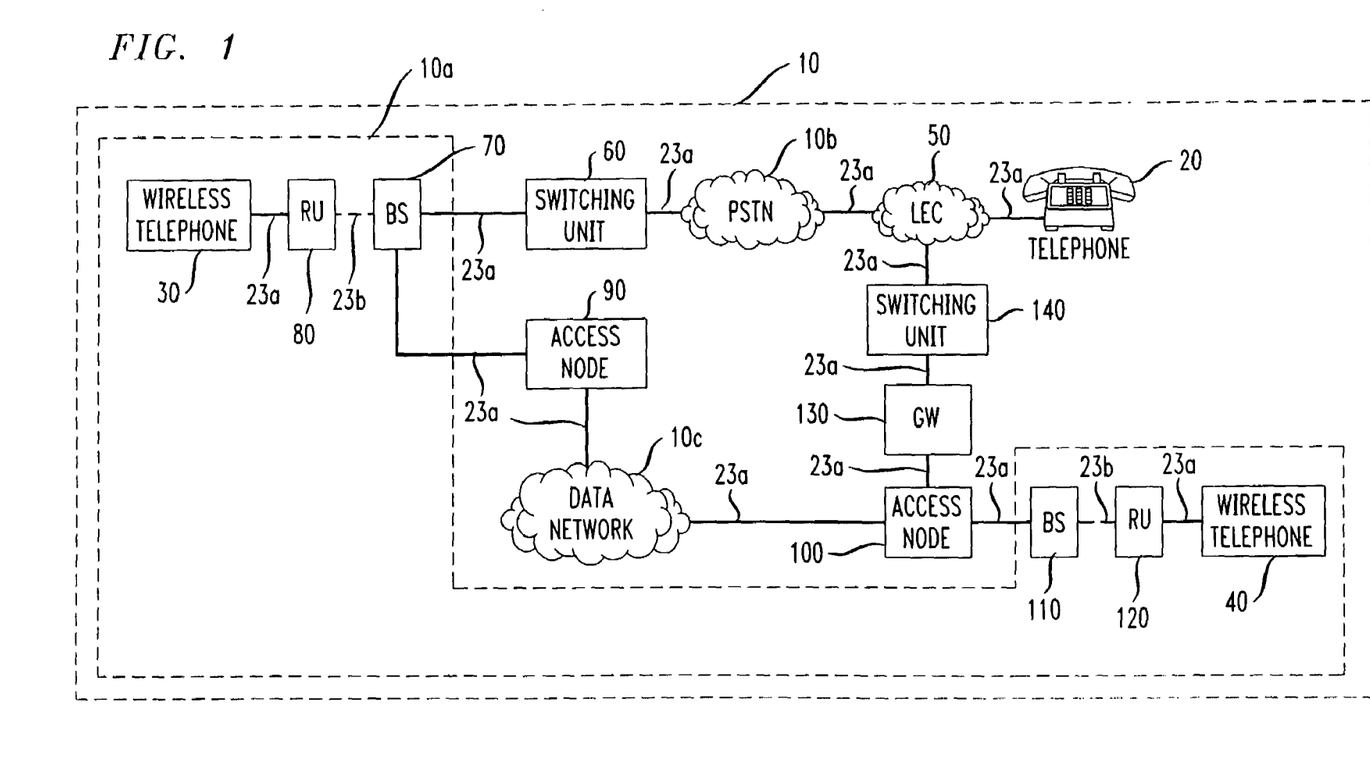
FIG. 1 is a block diagram illustrating a system for managing the routing of packets over a hybrid communication network in accordance with one embodiment of the present invention.

FIG. 1 shows a simplified hybrid communication network 10 suitable for use in accordance with an embodiment of the present invention. It will be recognized that the network of FIG. 1 includes other known elements, but those elements have been omitted for simplicity.

Referring to FIG. 1, network 10 comprises at least one calling party location, such as location 30, at least one information transfer network, such as fixed wireless network 10a, Public Switched Telephone Network (PSTN) 10b or data network 10c (i.e. ATM based backbone) and at least one destination party location, such as locations 20 and 40. Destination location 20, subscribes to PSTN 10b and destination location 40 subscribes to network 10a.

A wired information transfer network, such as PSTN 10b, generally comprises a plurality of conventional switches (not shown) that are interconnected to enable wired device 20 to communicate with other devices within or outside PSTN 10b via LEC 50. The wired device may be a conventional telephone 20, as illustrated in FIG. 1, or any other communication device (not shown) connected to PSTN 10b by various communications links 23a (e.g., analog, ISDN, etc). For example, wired device 20 could include facsimile devices, personal computers, modems, etc.

Data network 10c includes a packet switched network, comprising, preferably, an Asynchronous Transfer Mode (ATM) subnetwork using protocols such as TCP/IP, X.25, ATM, etc. A data network such as network 10c, generally comprises a plurality of packet routers for transmitting packets of data. The packets include address headers, error correction bits, synchronization bits and the like. It is understood that the present invention may be applied to any type of data packet subnetwork using the structures and methods described herein and is not limited to ATM subnetworks.

Referring to FIG. 1, there is shown a simplified block diagram of a wireless communication network 10a forming part of a hybrid network 10, its logical entities as well as its relative connection to PSTN 10b and data network 10c. In the following description, the wireless communication network 10a is described in the context of a fixed wireless subscriber's telephone, such as device 30. It will, however, be understood that the methods and systems of the present invention can be applied to other wired or wireless modem communication systems such as laptop computers and fax devices.

Wireless communication network 10a, as illustrated in FIG. 1, comprises a fixed wireless subscriber's telephone, such as devices 30 and 40, remote units (RUs) 80 and 120, and base stations (BSs) 70 and 110. Typically, remote units 80 and 120 and base stations 70 and 110 each include a microprocessor (not shown) to control operations thereof.

Base stations 70 and 110 and remote units 80 and 120 each have a transceiver. Such transceivers include any modulation/demodulation, filtering, and other signal processing circuitry required for communicating in accordance with protocol and modulation techniques supported by the wireless systems.

Further, remote unit 80 is connected to device 30 by communication path 23a and base station 70 is connected to remote unit 80 by airlink channel 23b. Similarly, remote unit 120 is connected to device 40 by a communication path 23a and base station 110 is connected to remote unit 120 by airlink channel 23b. Communication path 23a may be any number of wire-line transport services such as analog, ISDN, T1 or E1 line, or any of a number of other wireless alternative links. Airlink channel 23b may be any wireless highway of fixed bandwidth that is used to transfer data between remote units 80 and 120 and base stations 70 and 110, respectively, at fixed speeds. Devices 30 and 40, remote units 80 and 120, and base stations 70 and 110 use airlink channel 23b and communication path 23a to set up the call and to forward the voice or data to the destination device; the destination device being either a wireless device 40 or wired telephone 20. Throughout the communication process, it is base station 70 that provides overall control and thereby ensures that the operation of the whole wireless system is supported and serviced.

In operation, base stations 70 and 110 couple devices 30 and 40 to (PSTN) 10b or data network 10c. As illustrated in FIG. 1, such coupling occurs through communication paths 23a, access nodes 90 and 100, Gateway 130 and switching units 60 and 140. As indicated above, communication paths 23a may be any number of wire-line transport services such as analog, ISDN, T1 or E1 line, or any one of a number of other wireless alternative links. Access nodes 90 and 100 perform all the switching functions related to call delivery through data network 10c. Nodes 90 and 100 are connected to data network 10c, Gateway 130, and base stations 70 and 110. Switches 60 and 140 perform all the switching functions related to call delivery through PSTN 10b. Switch 60 is connected between PSTN 10b and base station 70 and switch 140 is connected between PSTN 10b and base station 110. Switch 140 is also connected between PSTN 10b and Gateway 130. As is known in the art, switching units 60 and 140 typically consist of class 4/5 programmable digital switch with CCIS communications capabilities. Switching units 60 and 140, can be for example, a SESS switch manufactured by AT&T or any comparable digital switch made by other vendors, such as Northern TeleCom and Seimans.

Gateway 130 includes a database and process unit (not shown). The database in Gateway 130 maintains an inventory profile of routings to fixed wireless network 10a and PSTN 10b, all switching units (e.g., switching units 60 and 140) and all access nodes (e.g., access nodes 90 and 100). The database is used by Gateway 130 to determine a routing path to a fixed wireless subscriber, such as device 30, when a call is originated from an analog telephone (POTS) user, such as telephone 20 to device 30. Gateway 130 also uses the database to determine a routing path from an access node, such as node 90, to a PSTN 10b subscriber, such as telephone 20, when a call is originated from a fixed wireless subscriber telephone, such as device 30, to an analog telephone (POTS) user telephone, such as telephone 20.

Database may include storage devices such as random access memory (RAM), read only memory (ROM) and/or programmable read only memory (PROM), an erasable programmable read-only memory (EPROM), an electronically erasable programmable read-only memory (EEPROM), a magnetic storage media (i.e., magnetic disks), or an optical storage media (i.e., CD-ROM), and such memory devices may also be incorporated into a processing unit. Processing unit (not shown) includes software and hardware used by Gateway 130 to perform internetworking functions, such as packetization and depacketization, between a fixed wireless subscriber, such as device 30, and a POTS user, such as telephone 20.

Figure 2:
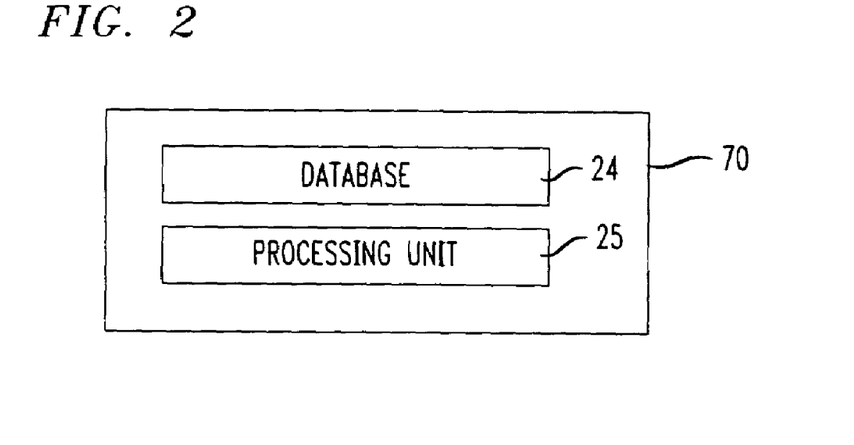
FIG. 2 is a block diagram illustrating an embodiment of a base station of FIG. 1.

Shown in FIG. 2 is a high-level block diagram of a base station FIG. 1 in accordance with the invention. Design and operation of such base stations are well known to ordinarily skilled artisans, and the ensuing description sets forth merely by way of example certain functional blocks and their interconnection as may be embodied in a base station which may be used in accordance with the present invention.

The following discussion will focus on base station 70, although base station 110 contains a similar database. Base station 70 includes a database 24 and processing unit 25. The database 24 in base station 70 maintains an inventory profile record of all subscribers to the wireless service, identification numbers associated with other types of calls (e.g., calls to subscribers of PSTN 10b) and call routing information for all base stations in wireless service network 10a. Database 24 may include storage devices such as random access memory (RAM), read only memory (ROM) and/or programmable read only memory (PROM), an erasable programmable read-only memory (EPROM), an electronically erasable programmable read-only memory (EEPROM), a magnetic storage media (i.e., magnetic disks), or an optical storage media (i.e., CD-ROM), and such memory devices may also be incorporated into processing unit 25.

Processing unit 25 in base station 70 includes software used by base station 70 to perform the communications processing and control functions between base station 70 and fixed wireless subscriber devices, such as device 30, as well as all other control functions that are required for managing a call from such a device to a destination. For example, preferably, the software is used to determine a routing path based on the called party identification number (i.e. fixed wireless subscriber telephone or PSTN subscriber telephone).

Figure 3:
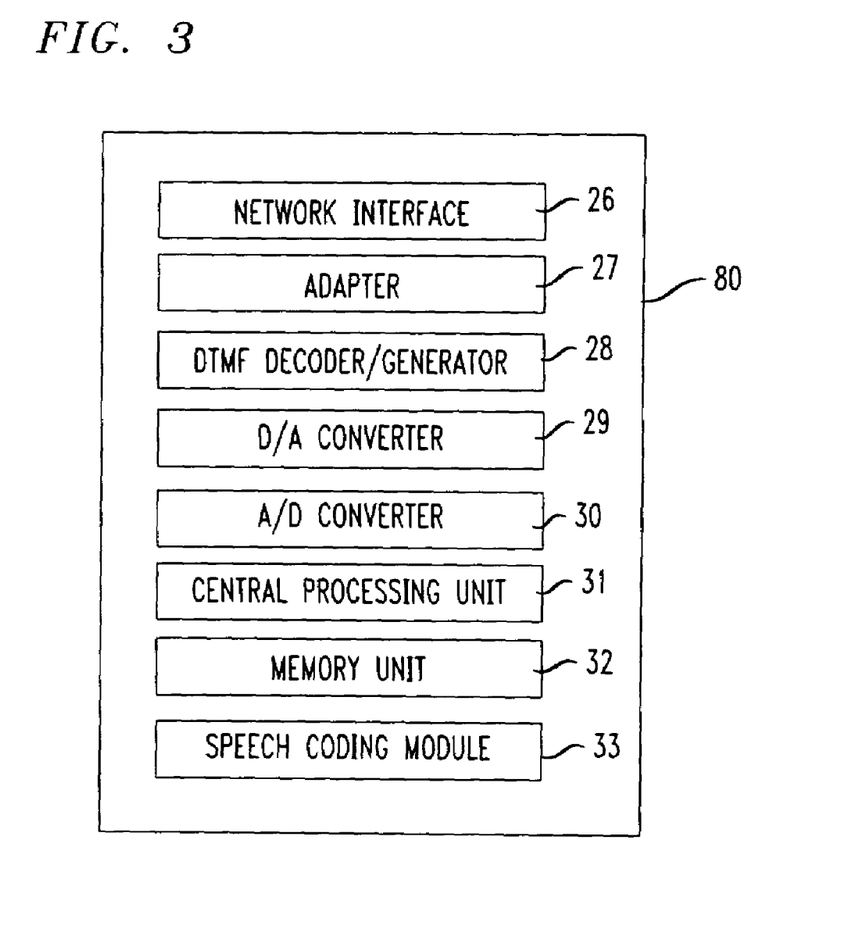
FIG. 3 is a block diagram illustrating an embodiment of a remote unit of FIG. 1.

Shown in FIG. 3 is a high-level block diagram of remote units 80 and 120 in accordance with the invention. Design and operation of such remote units are well known to ordinarily skilled artisans, and the ensuing description sets forth merely by way of example certain functional blocks and their interconnection as may be embodied in a remote unit which may be used in accordance with the present invention.

For simplicity, remote unit 80 will be described. It is understood, however, that remote unit 120 is similar to remote unit 80. Although remote units 80 may communicate with base station 70 according to known analog communication techniques, preferably remote unit 80 employs digital communication techniques. Remote unit 80 comprises a network interface 26, an adaptor 27 used for DTMF digit collection, DTMF decoder/generator 28 and a speech coding module 33. Remote units 80 also includes a D/A converter 29 to perform conversion of digitally sampled speech signals to analog speech signals and an A/D converter 30 to perform conversion of analog speech signals to digitally sampled speech signals. Further, remote unit 80 contains a central processing unit 31 and memory unit 32.

The overall function of remote unit 80 is controlled by central processing unit 31. Central processing unit 31 operates under control of executed computer program instructions which are stored in memory unit 32. Memory unit 32 may be any type of machine readable storage device. For example, memory unit 32 may be a random access memory (RAM), a read-only memory (ROM) and/or a programmable read-only memory (PROM), an erasable programmable read-only memory (EPROM), an electronically erasable programmable read-only memory (EEPROM), a magnetic storage media (i.e., magnetic disks), or an optical storage media (i.e., CD-ROM). Further, remote unit 80 may contain various combinations of machine readable storage devices which are accessible by central process unit 31 and which are capable of storing a combination of computer programs, instructions and data.

The telephone network interface module 26 handles the interaction between remote unit 80 and fixed wireless subscriber's telephone, such as device 30. Interface module 26 also handles the interaction between remote unit 80 and base stations, such as base station 70.

DTMF decoder/operator 28 converts DTMF tones into digital data. Speech coding module 33 performs compression and decompression of speech signals connecting at, for example, fixed wireless subscriber's telephone, such as device 30, and received over communication path 23a. Such speech signals are processed and converted into digital data by speech coding module 33. Preferred low-rate digital voice coding (less than 16 Kbps) is used. The functionality of module 33 may be implemented in hardware, software or a combination of hardware and software, using well-known signal processing techniques.

Remote unit 80 also perform functions such as switchhook operations, hybrid, ring detect, line termination, on/off hook signal interface signals and the like.

Figure 4:
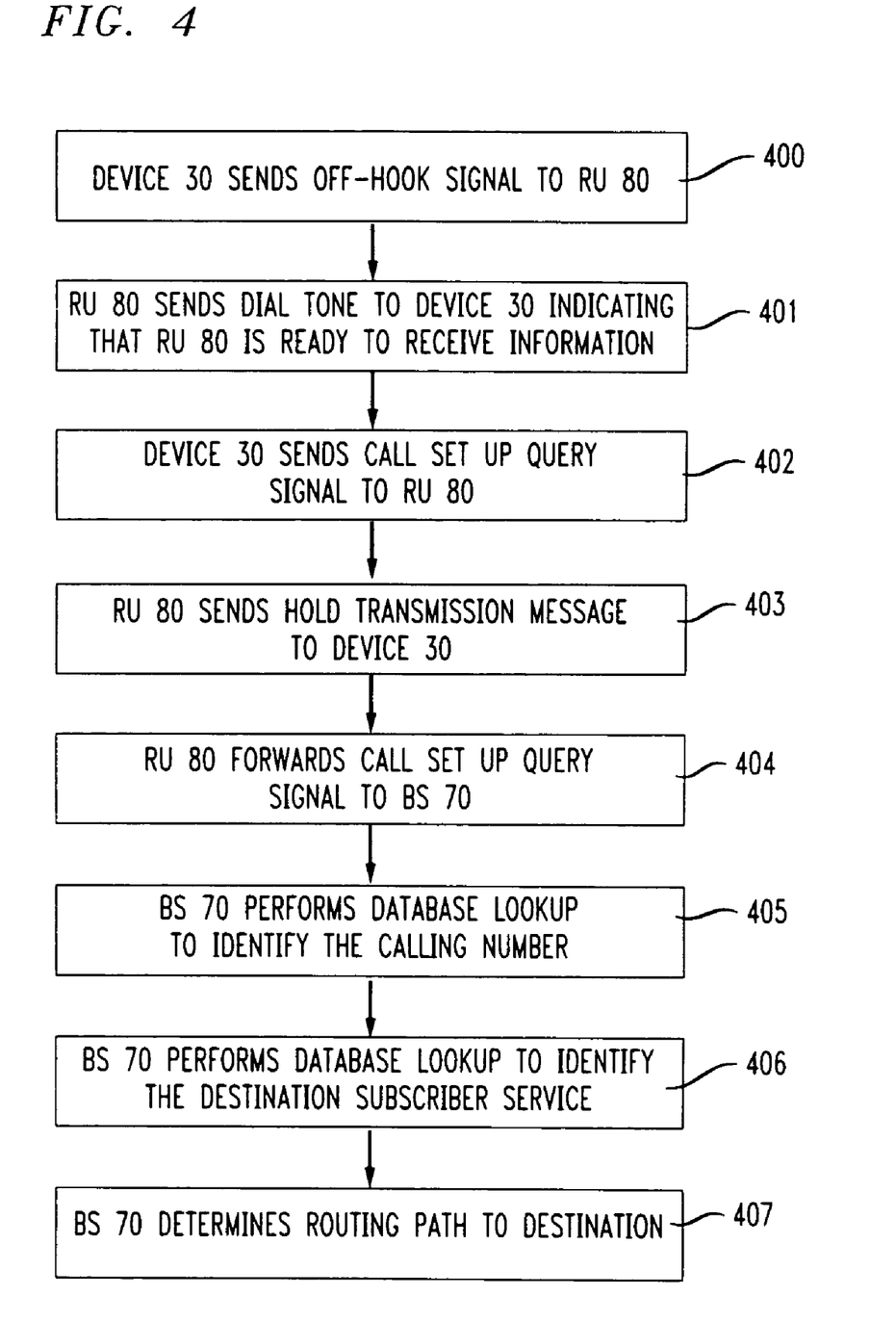
FIG. 4 is a functional block diagram of a method for setting up a call using the system of FIG. 1.

Referring to FIG. 4, there is illustrated an operational flow chart of how an embodiment of the present invention proceeds to set up a call in accordance with the system represented by FIG. 1. Referring now to FIG. 4, there is shown a flow diagram for a process executed by base station 70 in response to a call set up query placed by fixed wireless subscriber device 30 via remote unit 80. Specifically, when a call is placed by device 30, an off-hook signal is sent through communications path 23a to the transceiver of remote unit 80 (step 400). Remote unit 80 then sends a dial tone to device 30 indicating that it is ready to receive the called party's telephone number (step 401). Device 30 then sends DTMF signals to the transceiver of remote unit 80 via path 23a (step 402). The DTMF signals represent the call set up query and include the identification number corresponding to the destination. Remote unit 80 then sends a hold transmission message to device 30 (step 403) and remote unit 80 forwards the call set up query to the transceiver of base station 70 via airlink channel 23b (step 404).

Base station 70 performs a database 24 look-up to identify the calling subscriber (step 405). Once the base station 70 processes the calling party features, it may perform any calling party based treatment (e.g., call blocking, reverse billing, etc.). Base station 70 then identifies the destination identification number, held in packet payload, and determines the subscriber service associated with the destination identification number (step 405).

Specifically, base station 70 looks in database 24 to determine whether the destination identification number corresponds to a wireless subscriber, such as device 40, or a PSTN subscriber, such as device 20 (step 406). Once base station 70 identifies the destination, base station 70 determines a routing path from device 30 to the destination based on base station's 70 knowledge of the network topology (step 407).

Figure 5:
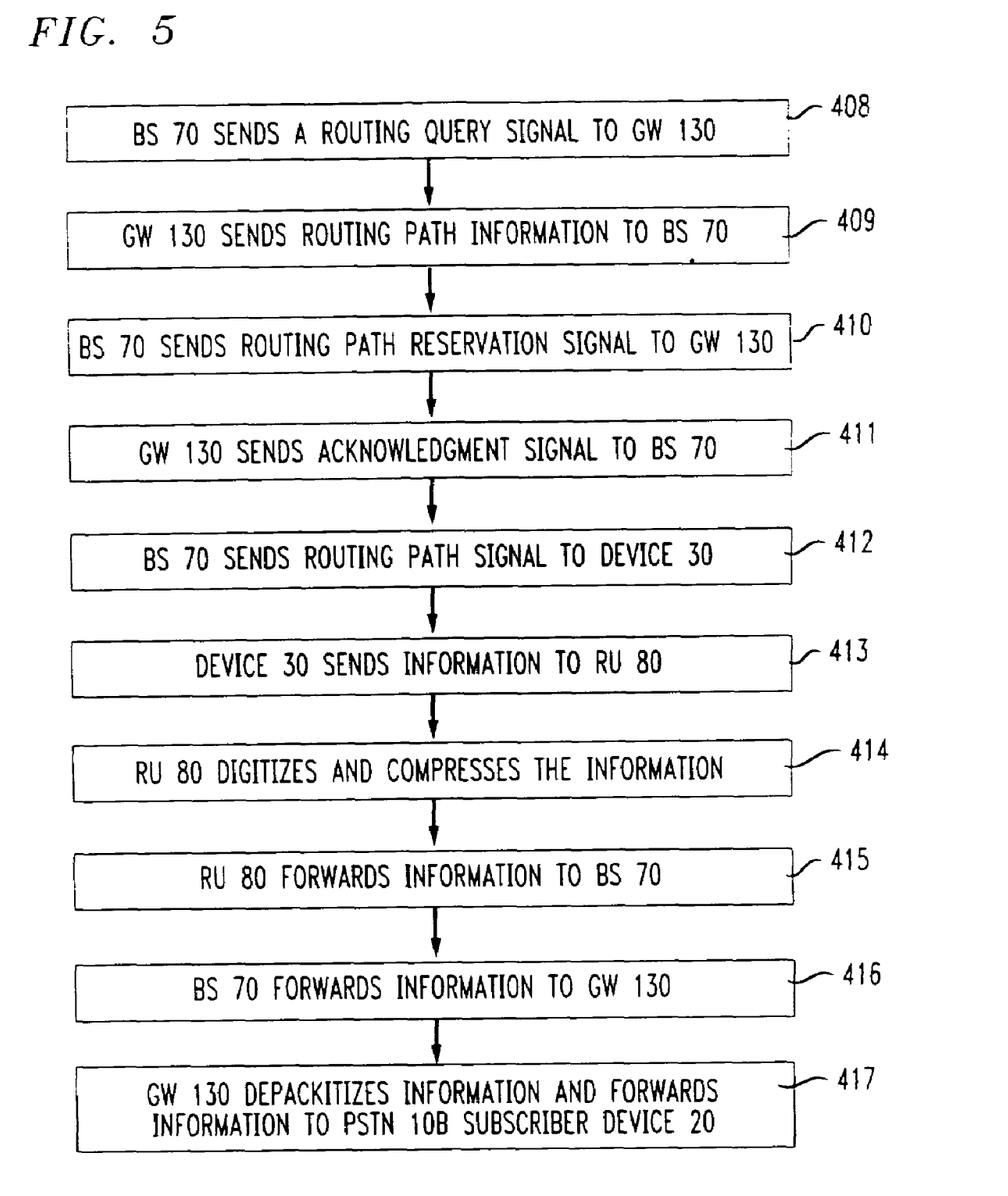
FIG. 5 is a functional subscriber block diagram of a method for determining a routing path to a PSTN subscriber destination and forwarding a call to said destination through such a path using the system of FIG. 1.

Referring now to FIG. 5, an operational flow diagram is illustrated for the process executed by base station 70 in determining a routing path (step 407) based on a fixed wireless subscriber originated call (e.g., originating from device 30 of FIG. 1) placed to the destination number of a PSTN 10b subscriber (e.g. wired telephone 20 of FIG. 1).

Base station 70 sends a routing query signal to Gateway 130 through access node 90, data network 10c and access node 100, respectively (step 408). Gateway 130 checks its database and determines a routing path from access node 100 to PSTN 10b subscriber device 20 through switching unit 140 and LEC 50, respectively. Gateway 130 then sends the routing path information to base station 70 through access node 100, data network 10c and access node 90, respectively (step 409). Base station 70 then reserves the routing path by sending a reservation signal to Gateway 130 and Gateway 130 reserves the elements on the routing path (step 410). Once the network elements are reserved a reservation acknowledgement signal is sent from Gateway 130 to base station 70, via access node 100, data network 10c and access node 90, respectively (step 411). Base station 70 then sends a routing path signal to device 30 via remote unit 80 (step 412).

The routing path signal includes a signal informing remote unit 80 to turn transmission on and start transmitting the information. Device 30 sends voice information to remote unit 80, via communication path 23b (step 413), and remote unit 80, then digitizes and compresses such information (step 414). Remote unit 80 then forwards this digitized information to base station 70, via airlink channel 23b (step 415) and base station 70 packetizes the information and forwards it to Gateway 130 through access node 90, data network 10c and access node 100, respectively (step 416). Gateway 130 depacketizes such voice information and forwards it to device 20, through switching unit 140 and LEC 50, respectively (step 417).

An alternative method for routing a call to a PSTN 10*b* subscriber device 20 is through the standard circuit switched network without packetization. Specifically, a call is forwarded from base station 70 to device 20 through switching unit 60, PSTN 10*b* and LEC 50, respectively.

Figure 6:
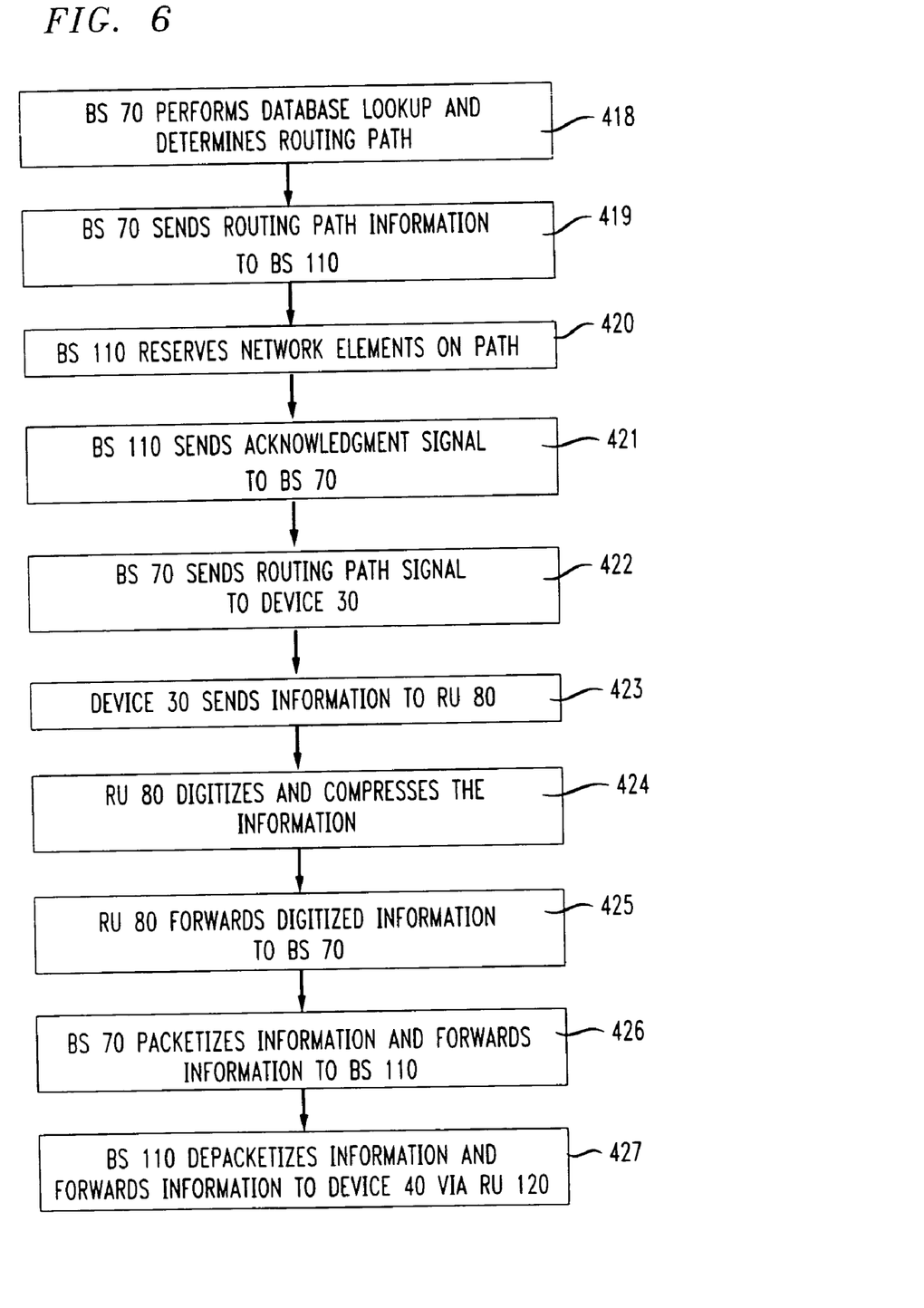
FIG. 6 is a functional block diagram of a method for determining a routing path to a fixed wireless subscriber destination and forwarding a call to said destination through such a path using the system of FIG. 1.

Referring now to FIG. 6, an operational flow diagram is illustrated for the process executed by base station 70 in determining a routing path (step 407) based on a fixed wireless subscriber originated call (e.g., originating from device 30 of FIG. 1) placed to the destination number of another fixed wireless subscriber (e.g., device 40 of FIG. 1). Base station 70 performs database 24 look-up and determines a routing path to destination device 40 (step 418). Base station 70 then reserves the path by sending reservation signals to base station 110 through access node 90, data network 10*c*, and access node 100, respectively (step 419). Base station 110 reserves the network elements on routing path (step 420). Once the network elements on the path are reserved, base station 110 sends acknowledgement signals to base station 70, via access node 100, data network 10*c*, access node 90, respectively (step 421). Base station 70 then sends a routing path signal to device 30 via remote unit 80, respectively (step 422).

The routing path signal includes a signal informing remote unit 80 to signal device 30 to turn transmission on and start transmitting the information. Device 30 then sends voice information to remote unit 80, via communication path 23*b* (step 423), and remote unit 80, then digitizes and compresses such information (step 424). Remote unit 80 then forwards this digitized information to base station 70, via airlink channel 23*b* (step 425), and base station 70 packetizes the information and forwards it to wired device 40 through access node 90, data network 10*c*, access node 100 and base station 110, respectively (step 426). Base station 110 depacketizes such voice information and forwards it to device 40 via remote unit 120 (step 430).

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

We claim:

1. A system for managing the routing of information from a source to a destination through a plurality of networks, wherein at least one of the networks is a packet network, the system comprising:
 a routing processor for receiving a query signal from the source via a wireless link, wherein the query signal specifies the destination to which the information will be routed, and wherein the processor is configured to identify a subscriber service associated with the destination;
 at least one subsystem that stores:
  one or more characteristics of the source;
  one or more characteristics of the destination, said one or more characteristics of the destination including the type of equipment at the destination, and information indicating a type of service associated with the destination wherein the type of service is one of a fixed wireless service or a PSTN service; and
  information about the topology of the networks;
 at least one subsystem, accessible from the routing processor, that determines a route for the transmission of the information based on:
  the query signal,
  the identified subscriber service associated with the destination,
  the characteristics stored in the memory, and
  the information about the topology of the networks; and
 at least one subsystem, other than the source, that converts the information sent over the route into data packets.

2. The system according to claim 1, wherein the source subscribes to a fixed wireless service network.

3. The system according to claim 2, wherein the destination subscribes to the same fixed wireless service network as the source.

4. The system according to claim 2, wherein the destination subscribes to a PSTN service network.

5. The system according to claim 1, wherein the information includes digitized voice information.

6. The system according to claim 1, wherein the signal is a DTMF signal.

7. A method for managing the routing of information to a destination through a plurality of networks, wherein at least one of the networks is a packet network, and wherein each network is linked to at least one other network by a communication medium, the method comprising:
 receiving a query specifying a destination to which the information will be routed at a routing processor, wherein the destination is one of at least two possible destinations, and wherein the type of equipment at the destination is one of a fixed wireless subscriber device or a PSTN subscriber device
 storing one or more characteristics of the destination, including information indicating whether the equipment at the destination is fixed wireless subscriber device or a PSTN subscriber device;
 storing information about the network topology;
 identifying a subscriber service associated with the destination; and
 if the destination subscribes to a service associated with a wired information transfer network, determining a route for the transmission of the information based on
  the query
  the one or more stored characteristics, and
 converting the information sent over the route into data packets.

8. The method according to claim 7, wherein the storing the one or more characteristics includes storing at least one address for the destination.

9. A method for managing the routing of information to a destination through a plurality of networks, wherein at least one of the networks is an ATM packet network, and wherein each network is linked to at least one other network by a communication medium, the method comprising:
 receiving a query specifying a destination to which the information will be routed at a routing processor, wherein the destination is one of at least two possible destinations, and wherein at least three different types of equipment are each associated with a possible destination:
 storing one or more characteristics of the destination;
 storing information about the ATM packet network topology;
 identifying a subscriber service associated with the destination, wherein said subscriber service is one of a fixed wireless service or a PSTN service; and determining a transmission path for routing the information through the networks, wherein the determining is based at least in part on: the received query signal, the stored ATM packet network topology information the stored characteristics, wherein the stored characteristics include information indicating the type of equipment at the destination, and the identified subscriber service associated with the destination.

10. The method according to claim 9 wherein the equipment at the destination comprises a facsimile device.

11. The method according to claim 9 wherein the equipment at the destination comprises a computer.

12. The method according to claim 9 wherein the equipment at the destination comprises a modem.

13. The method according to claim 9 wherein, if the destination subscribes to a service associated with a wired information transfer network and the equipment at the destination is configured to accept information from the source via the wired information transfer network alone, and wherein the determined transmission path does not comprise an ATM packet network in addition to the wired information transfer network.

14. The method according to claim 9 wherein, if the destination subscribes to a service associated with a wireless information transfer network, the determined transmission path comprises at least one ATM packet network.

15. A system for managing the routing of information from a source to a destination through a plurality of networks, wherein at least one of the networks is an ATM packet network, the system comprising:
 a routing processor for receiving a query signal from the source, the signal specifying the destination to which the information will be routed, the destination being one of at least two possible destinations, wherein at least two different types of equipment are each associated with a possible destination;
 at least one subsystem that identifies a subscriber service associated with the destination;
 at least one subsystem that stores one or more characteristics of the destination wherein the stored characteristics include information indicating the type of equipment at the destination;
 at least one subsystem that identifies the subscriber service associated with the destination;
 at least one subsystem that stores information about the ATM packet network topology; and
 at least one subsystem that determines a transmission path for routing the information through the networks based at least in part on the received query signal, the stored ATM packet network topology information, the stored characteristics, and the identified subscriber service associated with the destination.

16. The system according to claim 15, wherein the source subscribes to a fixed wireless service network.

17. The system according to claim 16, wherein the destination subscribes to the same fixed wireless service network as the source and wherein the system further comprises at least one subsystem that converts the information sent over the transmission path into data packets.

18. The system according to claim 16, wherein the destination subscribes to a PSTN service network.

19. The system according to claim 15, wherein the information includes digitized voice information.

20. The system according to claim 15, wherein the signal is a DTMF signal.

21. A method for managing the routing of information to a destination through a plurality of networks, wherein at least one of the networks is an ATM packet network, and wherein each network is linked to at least one other network by a communication medium, the method comprising:
 receiving a query specifying a destination to which the information will be routed at a routing processor, wherein the destination is one of at least three possible destinations, and wherein at least two different types of equipment are each associated with a possible destination;
 storing information about the ATM packet network topology;
 identifying a subscriber service associated with the destination;
 determining a route for transmission of the information based on the query, the type of equipment at the destination, the network topology and the subscriber service associated with the destination; and
 converting the information sent over the route into data packets.

22. The method according to claim 21, wherein the identified service is a wireline service and the equipment at the destination does not include digital capabilities.

23. The method according to claim 21 wherein the identified service is a wireline service and the equipment at the destination includes digital capabilities.

* * * * *